June 21, 1932. F. W. SCHARF 1,863,882
AUTOMOBILE HEATER
Filed May 6, 1929 2 Sheets-Sheet 1
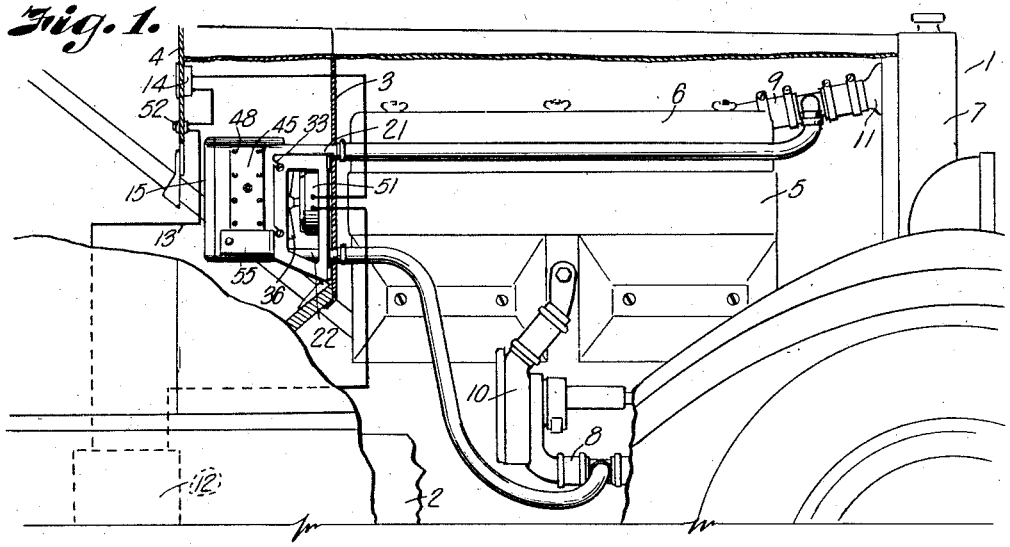
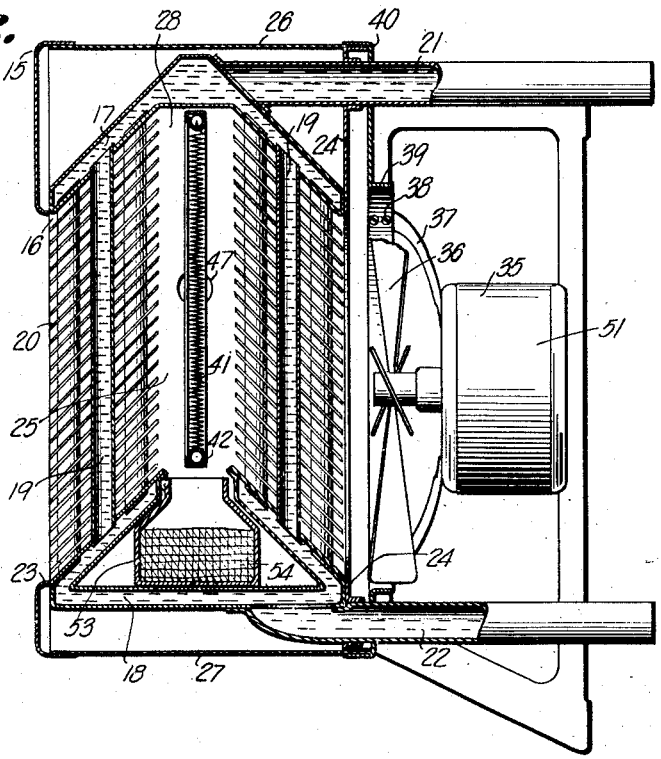
INVENTOR
Frank W. Scharf
BY
ATTORNEY

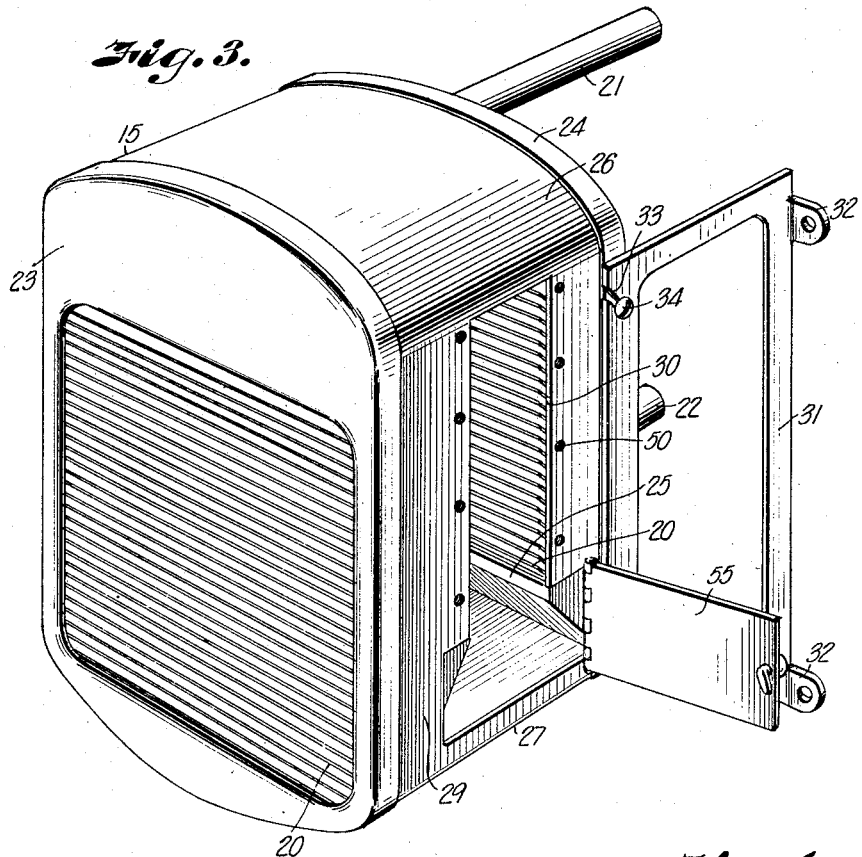
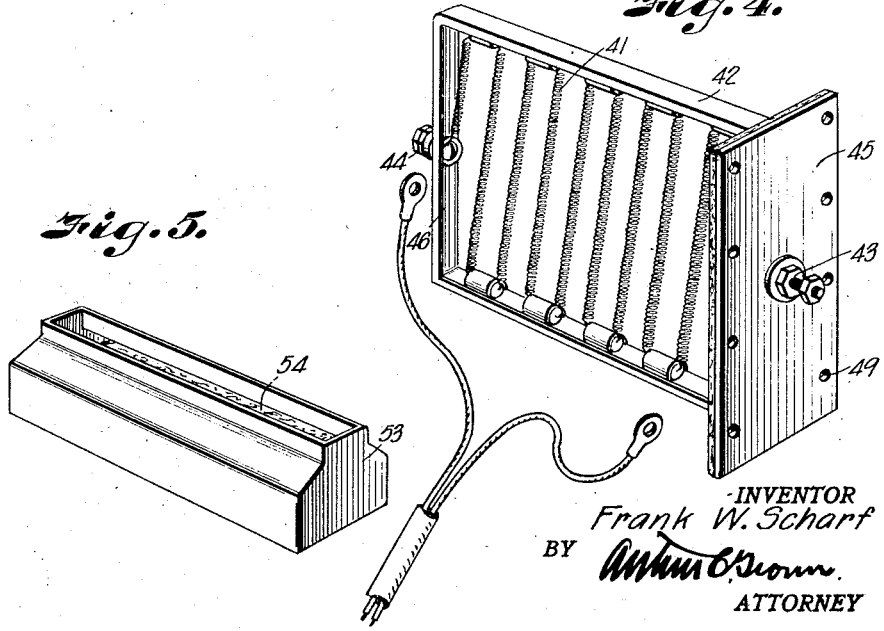

Patented June 21, 1932

1,863,882

UNITED STATES PATENT OFFICE

FRANK W. SCHARF, OF SIOUX CITY, IOWA

AUTOMOBILE HEATER

Application filed May 6, 1929. Serial No. 360,644.

My invention relates to heaters, and more particularly to automobile heaters and engine warmers, the principal objects of the invention being to combine automobile heating with engine warming features in a device of this character, to adapt an automobile heater for warming the engine of the automobile, to employ the heat generated by an automobile engine for warming the automobile, and to employ the water in ordinary automobile engine jackets as the agent for transmitting heat between an autumobile heater and the engine.

Further objects of my invention are to control the flow of air through a slotted heater housing, whereby the air may be retained in the housing or may be checked when moved therethrough by a fan, for more effective use of the heat distributed from the housing.

In accomplishing these and other objects of the invention, I have provided improved details of structure, the preferred forms of which are illustrated in the accompanying drawings, wherein:

Fig. 1 is a fragmentary view of the front end of an automobile and my heating device mounted therein, parts of the automobile being broken away to show the engine, and the device.

Fig. 2 is a central vertical section of the heater, particularly illustrating diagonal mounting of fins.

Fig. 3 is a perspective view of the heater housing and fins, heating elements being removed.

Fig. 4 is a perspective view of an electrical heating element.

Fig. 5 is a perspective view of a fuel container.

Referring in detail to the drawings:

1 designates generally an automobile including frame members 2, a dash 3, an instrument panel 4, a water cooled engine 5 including a head 6 comprising a portion of the water jacket of the engine, a radiator 7 and conduits 8 and 9 connecting adjacent ends of the engine jacket and radiator, and comprising ordinary automobile construction.

The automobile further includes, in the form to which the invention is preferably applied, a pump 10 adapted to induce and maintain circulation of water through the jacket and radiator, and a thermostat or valve 11 mounted in the outlet conduit of the radiator, for controlling flow of circulating water. A battery 12 delivers current to circuit wires 13, and an ammeter 14 is mounted on the panel in the circuit for normal purposes involved in operating automobiles.

My invention includes a housing 15 mounted on the dash below the level of the lower edge of the instrument panel, and a radiator-like water conduit 16 mounted in the housing comprising upper and lower headers 17 and 18, and tubes 19 connecting the headers. Fins 20 of special construction and position are mounted on the tubes.

The headers are connected respectively with the inlet and outlet water conduits 8 and 9 by preferably flexible tubes or hose 21 and 22 extending through apertures provided for the purpose in the dash, the upper header preferably communicating with the upper conduit and the lower header with the lower conduit whereby portions of water normally circulating through the radiator and water jacket may be by-passed and circulated through the heater for purposes presently disclosed.

The heater housing or shell comprises parallel spaced front and back end walls or portions 23 and 24 having registering openings and forming a central chamber 25 therebetween, a cover portion 26 and a bottom portion 27 similarly closing the lower end. One side wall 28 of the housing is closed, while the other side wall 29 has a vertically elongated opening 30.

The vertical tubes and fins are mounted in spaced sets or series in or at the openings in front and back walls 23 and 24 of the heater, to form a central heat-retaining chamber therebetween, and the headers comprise chambers extending across the upper and lower ends of the central chamber of the housing to receive the upper and lower ends of the tubes.

The fins are mounted in a particular manner on the tubes, their surfaces being inclined downwardly outwardly from the central housing chamber, to form oppositely directed deflectors, so that outward movement of air from the chamber is retarded and tends to be retained within the chamber, but may be driven outwardly and moved through the housing from one side to the other by forced blast means presently described. Attention is called to the fact that the fins on one series of tubes are inclined oppositely to the fins on the other series.

The housing is preferably supported from the dash by spaced parallel brackets 31 having rear ears 32 for attachment to the dash and slanting notches 33 in their front edges to receive laterally projecting lugs 34 on the sides of the heater housing whereby the heater is supported in spaced relation with the dash to accommodate a motor 35 and fan 36 keyed to the motor shaft.

The motor may be supported by spider-like arms 37 extending from the motor housing and fixed by bolts 38 to an annular flange 39 on an apertured plate 40 spaced from and fixed to the heater housing whereby the fan may induce a current of air and blow air through the housing into the automobile for heating the same, when the water circulating through the heater is warm.

I further provide heating means adapted to be mounted in the housing chamber and preferably comprising a resistance coil 41 supported on a frame 42 having contact posts 43 and 44 adapted to be connected with a source of electrical energy, for example a house lighting circuit. The frame is adapted to be positioned in the chamber between the spaced series of tubes and is provided with a door plate or panel 45 adapted to overlie the edges of the end wall 29 at the opening 30 and close a portion of the opening.

The contact post 43 is mounted in the panel 45, and the post 44 is aligned with the post 43 and mounted in a leg 46 of the frame, for projection through an opening 47 in the end wall 28 of the heater housing. The coil frame may be secured in mounted position by means 48 extending through openings 49 in the panel and into threaded openings 50 in the end wall 29 of the heater housing.

The fan motor may be connected through circuit wires 51 with the battery, and a switch 52 may be inserted in the circuit to control the same so that the fan may be put into operation when desired.

In Fig. 5 is shown a supplemental heat generating element comprising a tray 53 adapted to contain a volatilizable fuel such as alcohol carried by a wick 54. The tray may be deposited on the floor of the housing for heating the tubes and water therein. A door 55 is hinged to the side wall 29 for closing the lower end of the housing chamber, below the panel 45.

The device may be mounted on an automobile and connected with the water jacket of the engine without material changes in normal elements of the automobile, the hose leading between the heater and the jacket being connected to the conduits which connect the jacket with the radiator. Water in the jacket will tend to circulate also through the heater, and the tubes of the heater will exchange heat with the water, whereby the temperature of the engine and the temperature of the heater will tend to be equalized.

A pump provided for inducing circulation of water between the jacket and radiator may assist in promoting circulation through the heater, for example, when the heater is employed for delivering heated air to the portion of the automobile occupied by persons.

When the engine is operating and raisng the temperature of the water in its jacket, the heated water will circulate through the heater, and the fan may be set in operation by manipulating the switch to close the circuit to the motor. A current of air will then by blown through the housing over the fins and tubes into the space occupied by driver and passengers. The air will be warmed by heat of the tubes and fins which are heated by the water from the engine jacket.

Attention is called to the inclined position of the fins on the spaced series of tubes, whereby air from the fan is discharged into the housing in an upward direction and finds exit only by way of the oppositely inclined fins and in a downward direction. The fins thus serve as baffles first to divert the air to an angular path upon entrance to the housing, and then to divert the air into another direction, whereby the column of air is detained appreciably in the central chamber in contact with the heated tubes and fins.

In cold climates, it is often desirable to heat an automobile engine before use to facilitate starting, and promote efficient operation of the engine. The heater may be heated, and the water will then circulate thermo siphonically through the engine, the thermostat 11 restricting circulation of the water to a path including the engine and heater. The thermostat will not permit water to move freely into and through the radiator of the automobile until the engine has been heated sufficiently for easy starting.

The resistance coil may be connected with a house circuit for energizing the electrical heating element, and a supplemental heating agent applied to the tubes, to accelerate the heating process.

While the supplemental agent may be delivered in any convenient manner and by any suitable means, I prefer to employ a gas or vapor for this purpose.

Attention is called to the downwardly diverging fins of the heater, whereby heated air in the chamber is prevented from flowing freely from the chamber, and tends to rise in the heater. The air is thus retained in contact with the tubes and fins, and heats the same, moving outwardly from the upper portion of the chamber, but relatively slowly, there being slight circulation into and out of the chamber.

When products of combustion are delivered to the chamber for promoting heating, their outward flow is retarded and they are detained in contact with the tubes and fins, and move relatively slowly over the upper fins toward atmosphere.

The supplemental heating agent may comprise a gas, and I preferably provide for combustion of the fuel within the chamber of the heater, a convenient and efficient method of applying the heat being by supplying the tray with a substance adapted to evolve gas, such as alcohol.

The combined heat effects of the resistance heater and the supplemental heating agent will raise the temperature of the water, effect circulation, and adequately heat the engine, to promote starting, in a period depending on several factors including the character of the elements, outside temperature, and the condition of the engine. As an indication of the character of results, when a 660 watt electrical element is employed, and alcohol used for the supplemental agent, the temperature of the engine may be raised to the desired degree for starting in approximately 20 minutes, the outside temperature being 20° below zero.

Attention is further called to the slanting position of the fins, which incline downwardly from the heater toward the floor of the automobile whereby the heated air is not only directed toward the feet of persons in the seats, but the distribution of the heat through the automobile is promoted. The heater will be positioned laterally on the dash from the steering wheel. The heated air tends to circulate over the lower portion of the automobile, and moves laterally across the floor and into the area occupied by the driver.

Pumps actuated by the engine for circulating water are ordinarily of centrifugal type will not restrict flow of water thermo siphonically in the circuit including the engine pocket and the heater.

What I claim and desire to secure by Letters Patent is:

1. In an automobile heater, a housing including spaced walls having registering openings, a radiator including spaced series of outwardly downwardly inclined fins located at said openings, and means for circulating water through the radiator.

2. In an automobile heater, a housing including spaced walls provided with registering openings, spaced series of communicating tubes located at said openings, outwardly downwardly inclined fins on said tubes, and means for circulating water through said tubes.

3. In a heater of the character described, a housing including spaced walls provided with registering openings, spaced series of tubes located in said openings, headers on said tubes, outwardly downwardly inclined fins on said tubes, and means including conduits connected with the headers for circulating water through said tubes.

4. In a device of the character described, a housing including walls having respectively air inlet and outlet openings, means for inducing flow of air through said openings to pass through the housing, means for heating air passing through the housing, and means including a series of inclined parallel deflectors located in one of said openings for retarding movement of said air, through the housing.

5. In a device of the character described, a radiator including vertically spaced inclined headers, and a series of tubes connecting the headers, means for inducing flow of air over said tubes, and means including a deflector inclined complementary to said headers for controlling direction of flow of air over said tubes.

6. A device of the character described, including a radiator comprising vertically spaced inclined headers for directing the flow of air through the radiator laterally spaced series of vertical tubes connecting the headers, and a housing enclosing the radiator.

7. In a heater, a radiator including vertically spaced headers having complementary outwardly, downwardly, inclined portions for directing the flow of air through the radiator, and spaced series of tubes connecting the headers.

8. In a heater, a radiator including vertically spaced headers having complementary outwardly downwardly inclined portions, spaced series of tubes connecting the headers, and series of fins on said tubes in inclined parallel relation to said headers for directing the flow of air through the radiator.

9. In a heater, a radiator including vertically spaced headers having complementary outwardly downwardly inclined portions, spaced series of tubes connecting the headers, and spaced series of fins on said tubes to form a heat-retaining chamber therebetween and inclined in parallel relation to said headers for directing the flow of air through the radiator.

In testimony whereof I affix my signature.

FRANK W. SCHARF.